(12) United States Patent
Sadre

(10) Patent No.: US 8,024,217 B2
(45) Date of Patent: Sep. 20, 2011

(54) METHOD OF TRADEABLE FINANCIAL INSTRUMENT FROM VALUE-ADDED MANUFACTURED PRODUCT BY PARETO MARKET ANALYSIS

(76) Inventor: Mamoud Sadre, Windham, NH (US)

( * ) Notice: Subject to any disclaimer, the term of this patent is extended or adjusted under 35 U.S.C. 154(b) by 2141 days.

(21) Appl. No.: 10/659,517

(22) Filed: Sep. 11, 2003

(65) Prior Publication Data

US 2004/0083162 A1 Apr. 29, 2004

(51) Int. Cl.
*G06F 19/00* (2006.01)
(52) U.S. Cl. ............... 705/7.33; 705/7.28; 705/7.29; 705/35; 705/400; 700/107
(58) Field of Classification Search ............ 700/95, 700/104, 107, 28, 106; 705/35, 7, 8, 10, 705/37, 38, 400, 7.28, 7.29, 7.33
See application file for complete search history.

(56) References Cited

U.S. PATENT DOCUMENTS

| | | | | |
|---|---|---|---|---|
| 5,539,652 A | * | 7/1996 | Tegethoff | 703/14 |
| 5,950,173 A | * | 9/1999 | Perkowski | 705/26 |
| 5,953,707 A | * | 9/1999 | Huang et al. | 705/10 |
| 6,134,536 A | * | 10/2000 | Shepherd | 705/37 |
| 6,625,619 B1 | * | 9/2003 | McClendon et al. | 707/104.1 |
| 6,633,788 B1 | * | 10/2003 | Riley et al. | 700/97 |
| 7,333,942 B1 | * | 2/2008 | Cowles | 705/26 |
| 7,349,879 B2 | * | 3/2008 | Alsberg et al. | 705/37 |
| 7,373,323 B1 | * | 5/2008 | Dalal et al. | 705/36 R |
| 7,516,084 B1 | * | 4/2009 | Sankaran et al. | 705/7.31 |
| 7,548,883 B2 | * | 6/2009 | Lawrence | 705/38 |
| 7,716,077 B1 | * | 5/2010 | Mikurak | 705/8 |
| 7,720,747 B2 | * | 5/2010 | Dalal et al. | 705/37 |
| 7,720,748 B2 | * | 5/2010 | Dalal et al. | 705/37 |
| 7,729,949 B2 | * | 6/2010 | Heaton et al. | 705/26.4 |

(Continued)

OTHER PUBLICATIONS

Rushton et al.; "The Handnoob of Logistics and Distribution Management"; 2000; Second edition; London: Kogan Page; pp. 106-108.*

(Continued)

*Primary Examiner* — Dave Robertson

(57) ABSTRACT

A method and system for design and development of financial instruments which enables businesses to benefit from the economic value of risk management. First the system develops a methodology, for specific sector, to extract root products. A database is designed to continually update the technical specifications of root products to ensure the uniformity of defined generic specification. Next the system database continually monitors, stores and analyzes the market intelligence required for determining the products relative market strength. Finally, a flexible contract product is designed transforming these products to financial instruments. Such financial instruments are continuously updated, added and deleted as the technical and market conditions change.

1 Claim, 12 Drawing Sheets

New Platform 200

U.S. PATENT DOCUMENTS

| | | | | |
|---|---|---|---|---|
| 2001/0027437 | A1* | 10/2001 | Turbeville et al. | 705/38 |
| 2001/0049651 | A1* | 12/2001 | Selleck | 705/37 |
| 2002/0007340 | A1* | 1/2002 | Isaf et al. | 705/37 |
| 2002/0156774 | A1* | 10/2002 | Beauregard et al. | 707/3 |
| 2003/0003985 | A1* | 1/2003 | Han | 463/17 |
| 2003/0014424 | A1* | 1/2003 | Sokol et al. | 707/102 |
| 2003/0018616 | A1* | 1/2003 | Wilbanks et al. | 707/2 |
| 2003/0033240 | A1* | 2/2003 | Balson et al. | 705/37 |
| 2003/0069986 | A1* | 4/2003 | Petrone et al. | 709/232 |
| 2004/0133502 | A1* | 7/2004 | Sadre | 705/37 |
| 2004/0143509 | A1* | 7/2004 | De Almeida Prado et al. | 705/26 |
| 2004/0143600 | A1* | 7/2004 | Musgrove et al. | 707/104.1 |
| 2004/0193528 | A1* | 9/2004 | Sadre | 705/37 |
| 2005/0044026 | A1* | 2/2005 | Leistner | 705/35 |
| 2005/0246197 | A1* | 11/2005 | Shepherd | 705/1 |
| 2007/0106601 | A1* | 5/2007 | Shepherd | 705/38 |
| 2010/0042531 | A1* | 2/2010 | Heaton et al. | 705/37 |

OTHER PUBLICATIONS

Shi Dahlin (2004) A review of enterprise supply chain risk management. Journal of Systems Science and Systems Engineering, 13:219-244.*

S. Kaplan, M. Sawhney, B2B E-Commerce hubs: towards a taxonomy of business models, Net Market Makers, 1999.*

Ryu, Y. U. 1998. Dynamic Construction of Product Taxonomy Hierarchies for Assisted Shopping in the Electronic Marketplace. In Proceedings of the Thirty-First Annual Hawaii international Conference on System Sciences-vol. 5-vol. 5 (Jan. 6-9, 1998).*

Noori, Hamid et al. "Fractal manufacturing partnership: exploring a new form of strategic alliance between OEMs and suppliers." Logistics Information Management v13n5 pp: 301-311. 2000.*

* cited by examiner

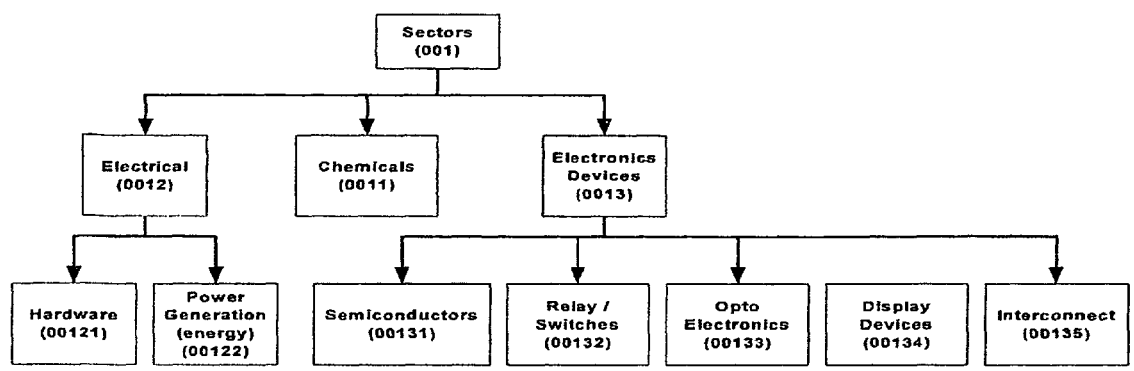
A fractal approach to industry sector analysis
FIG. 1 Sector Analysis

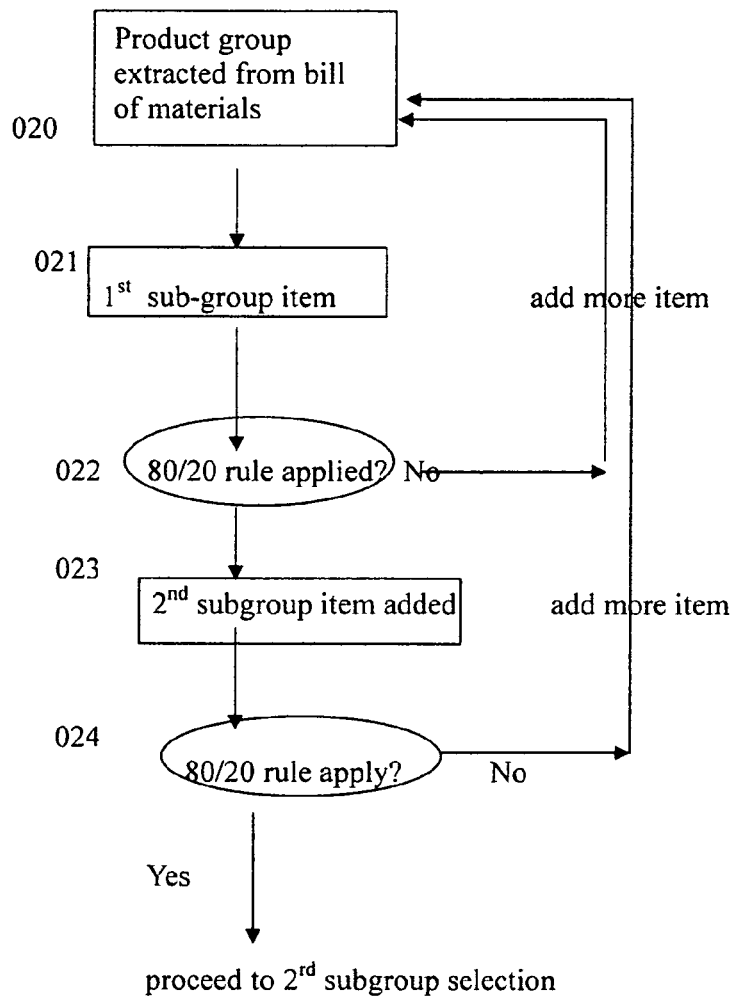
FIG. 2 Application of Pareto's Distribution Law

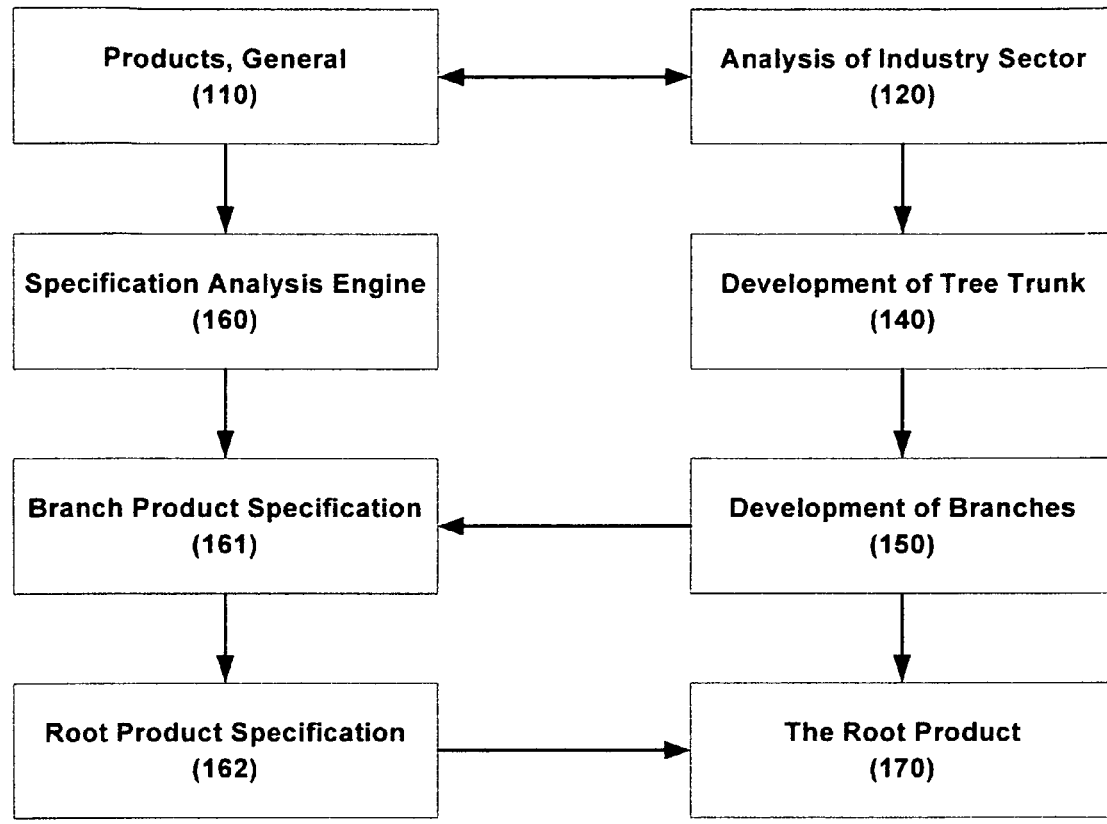
FIG. 3 Root Extraction Process 300

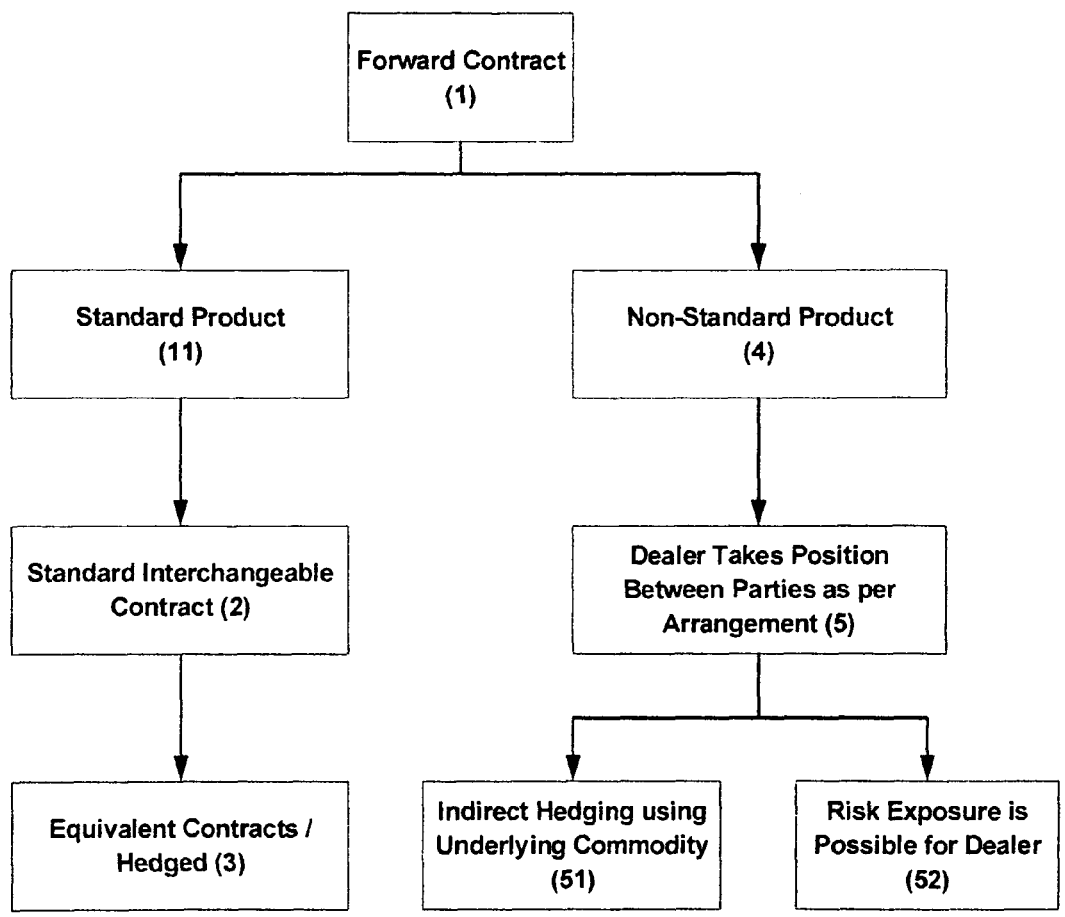
FIG. 4 Existing Forwards Platform 100

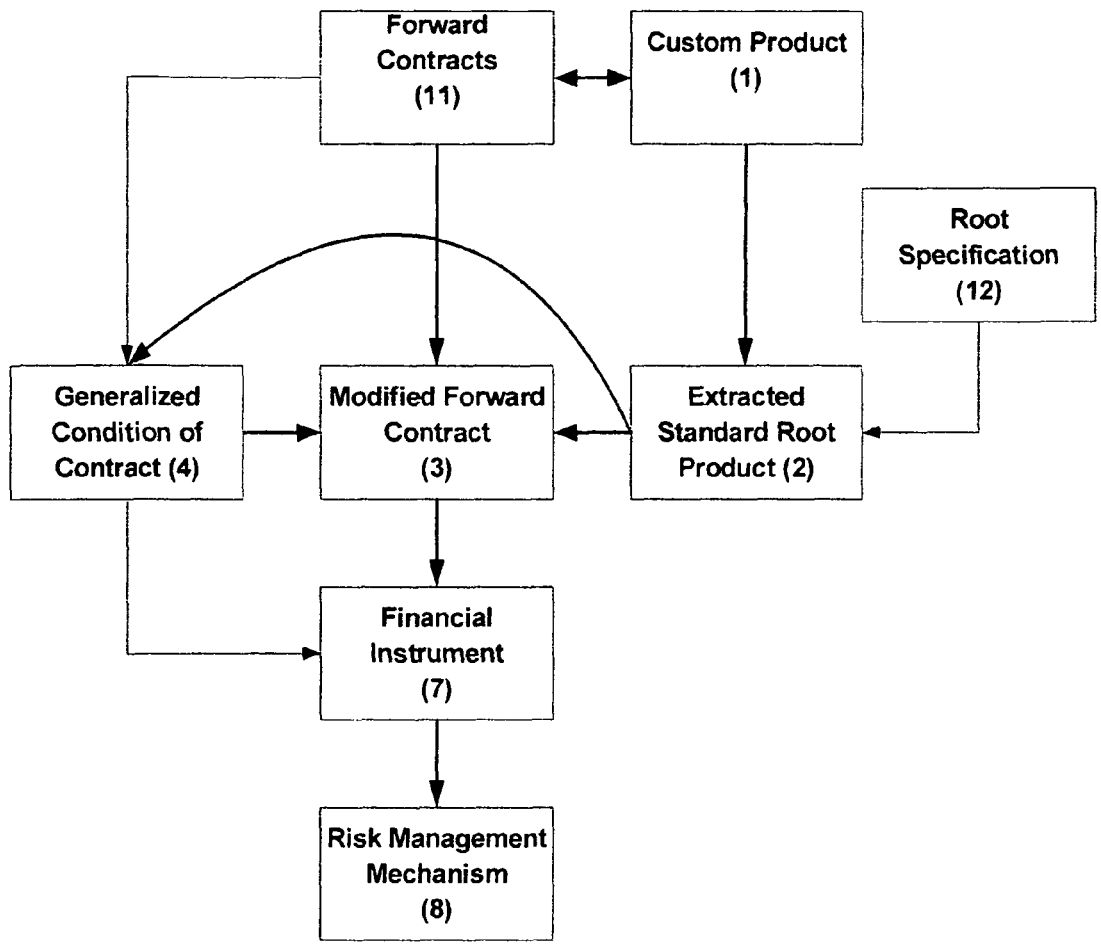
FIG. 5 New Platform 200

| Item 1 | Product as defined | a) Name ( any)<br>b) Description (any)<br>c) Unit ( no, pounds, ton, gallon, ounce)<br>d) lot size( 10,100,200, 500, 1000,10000,20000, 50000)<br>e) code (any) |
|---|---|---|
| Item 2 | Delivery Frequency | a) date: 30 day, 60 day, 90 day<br>b) date: calendar months<br>c) notice dates: T-x1, T-x2 |
| Item 3 | Trading Rules | a) marketplace (hybrid, futures, spot)<br>b) all months<br>c) hours ( 8am-2pm EST), (9am-3pm PST), (11am-5pm GMT), (9am-3pm pacific)<br>d) week begins ( Sunday, Monday)<br>e) week ends (Friday) |
| Item 4 | Pricing Mechanism | a) minimum fluctuation ( 1/100. 1/20, 1/10 of currency)<br>b) daily limit ( percentage of nominal contract value ;5%, 6%,7%,8%,9%,10%),<br>c) currency ( usd, usd & euro, usd & JPY, usd & local currency) |
| Item 5 | Financial Clearing | via Fiduciary account residing at commercial bank |
| Item 6 | Settlement Procedure | a) cash offset following financial clearing<br>b) physical delivery made against cash payment |

FIG. 6 Flexible Semi-Standard Contract

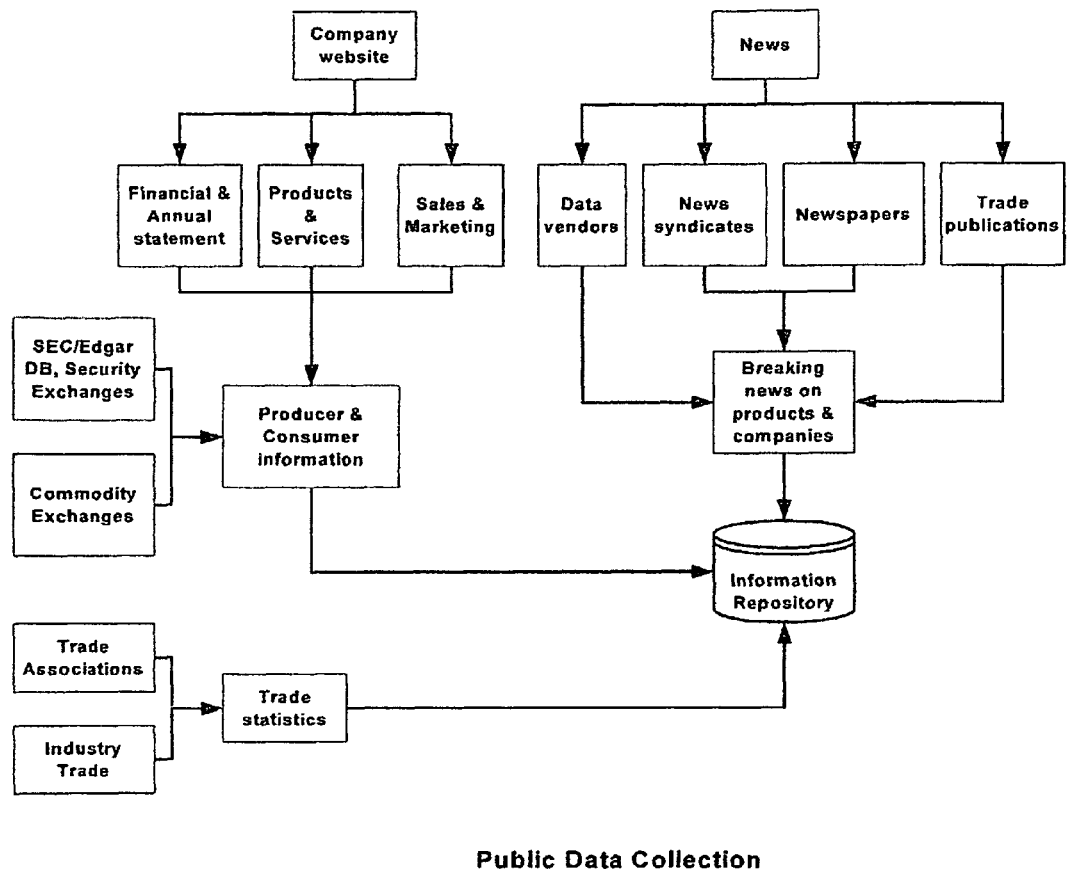
FIG. 7 Marketing information as collection of market data as well as relevant news

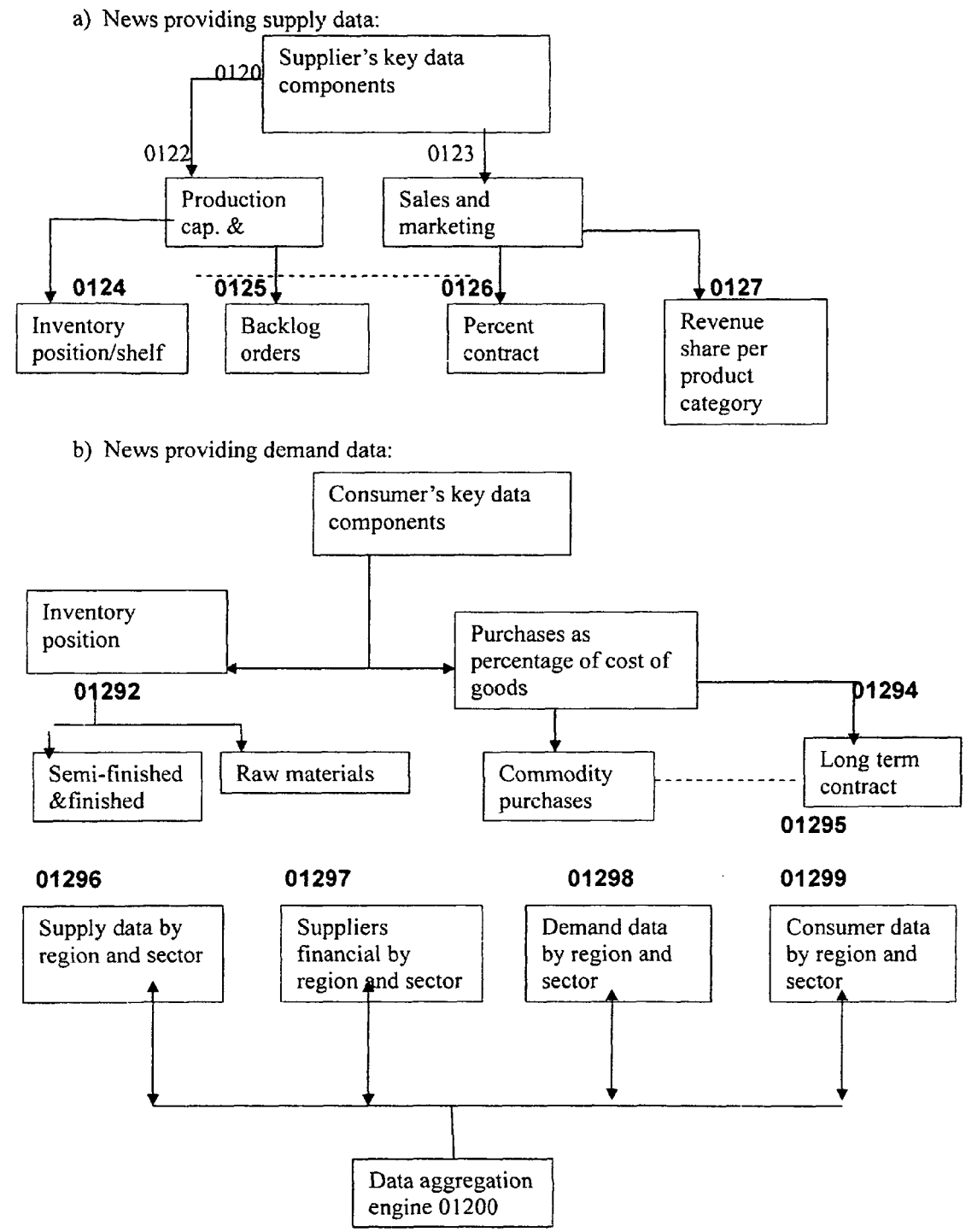
FIG. 8 Supply & Demand data are collected in a database

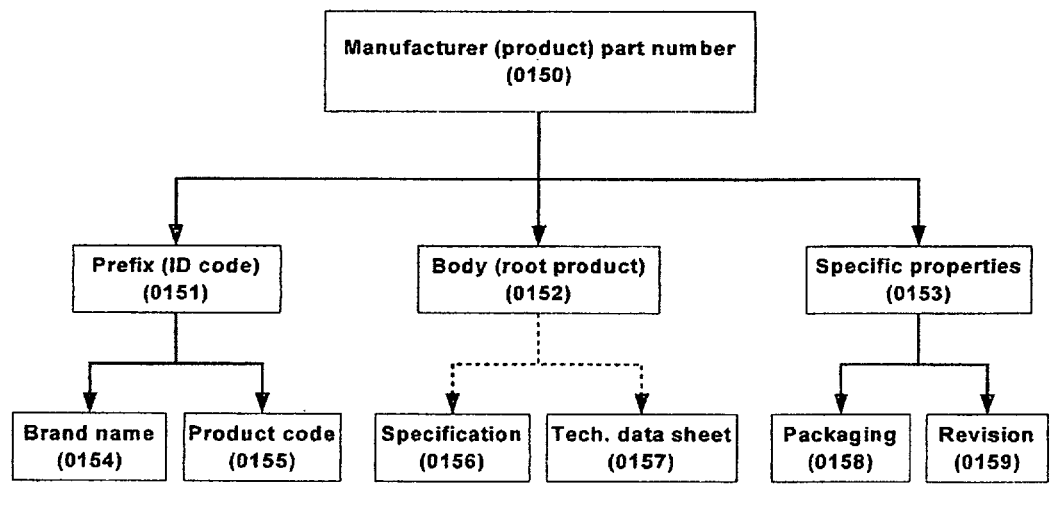
FIG. 9 Manufacturer part number as guide to technical specification

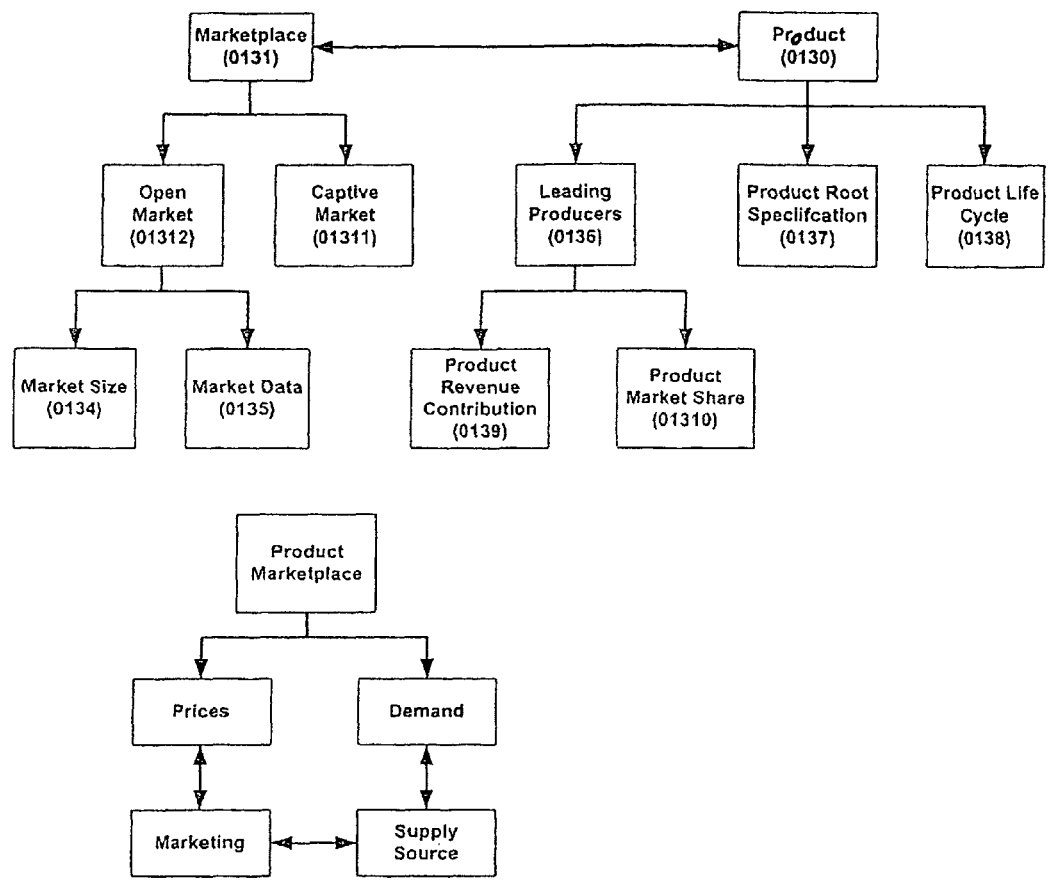
FIG. 10 Combining technical and marketing data

| Information | Primary source | Secondary source | Fee-based services |
|---|---|---|---|
| Product line | Company's website | Distributors website | |
| Key products | Company's financial | suppliers websites | Market researchers |
| Product market share | Company's report | Trade associations | Market researchers |
| Product prices | Open market | Supplier website | Daily survey |

FIG. 11 Sources of Data collection

| Industry sector | public companies | Market size in 1000 | Sub-Sector targeted | Average growth rate | Average Volatility |
|---|---|---|---|---|---|
| Electronics | 800 | 450,000,000 | Semicon | 15% | 50% |
| Chemical | 300 | 350,000,000 | plastics | 8% | 10% |
| Electrical | 56 | 320,000,000 | wholesale | 4% | 15% |

FIG. 12 Example of aggregate marketing data

| company | Last quarter/ projected sales | Global market share, 2001 | Product 1 | Product 2 | Cost of sales | International sales |
|---|---|---|---|---|---|---|
| Micron | $700 million | 18.00% | memories | - | 80% | 400,000 |
| Dell | $8.5 billion | <10% | memories | interconnect | 35% | 2,000,000 |

FIG. 13 Example of producer and consumer of same product

1. FOR EACH SECTOR

| Industry | Public companies | Market size | Average growth rate | Average volatility |
|---|---|---|---|---|
| | | | | |

2. FOR EACH PRODUCER/CONSUMER ENTITY

| Entity | Last reported revenue | Last reported cost of sales | % commodity related market share |
|---|---|---|---|
| | | | |

| Entity | Commodity 1, % of revenue | Commodity 2, % of revenue | Commodity 3, % of revenue |
|---|---|---|---|
| | | | |

| Entity | Currency 1, % of transaction | Currency 2, % of transaction | Currency 3, % of transaction |
|---|---|---|---|
| | | | |

3. FOR EACH PRODUCT

| Product description | Product symbol | Spot closing in USD | Spot closing in Yen | Spot closing in Euro |
|---|---|---|---|---|
| | | | | |

| Product description | Product symbol | 30 day forward closing price | 90 day forward closing price |
|---|---|---|---|
| | | | |

| Product description | Product symbol | Total available market | Relative market strength |
|---|---|---|---|
| | | | |

FIG. 14 The Database

METHOD OF TRADEABLE FINANCIAL INSTRUMENT FROM VALUE-ADDED MANUFACTURED PRODUCT BY PARETO MARKET ANALYSIS

CROSS REFERENCE TO RELATED APPLICATION

The present application is related to U.S. patent application Ser. No. 09/640,272 filed Aug. 17, 2000 entitled RISK MANAGEMENT FOR MANUFACTURING, the entire contents of which is hereby incorporated by reference.

BACKGROUND OF INVENTION

1. Field of the Invention

This invention relates to developing risk management tools for manufacturing environment to achieve market efficiency 2. Related Field The globalization of market economies is changing the way business in general, and manufacturing in particular, are conducted. In addition to the usual supply and demand factors, the huge inflows (and outflows) of capital from one market to another are creating a much larger market swing than the predictable seasonal or cyclical changes that occur from time to time. This stems from significant inter-manufacturing trades that take place routinely around the world. In a given environment there are risk elements that in normal circumstances are assumed to be known among the parties involved in the line of supply chain. Buyers and sellers in manufacturing sector expect a fixed price once an order is placed. They assume that the market conditions including currency and interest rates remain static during that period or if not each party is responsible for the risk involved.

In today's practices purchases and sales are made between any two parties in the old fashion way. A handshake. Such arrangements, known as forward contracts, bear a fixed price and promised delivery. A vast majority of these contracts remain exposed to risk; its significance has recently come to light mainly due to globalization of business activities. The manufacturing community has not yet addressed the question of shifting risk from tangible assets (the inventory) to paper trading (securities).

Manufacturers are aware of the risk involved in building up inventory if the market goes soft because an untimely liquidation can be costly. Those who do not maintain inventory assume a similar risk. A sudden increase in the price of raw materials may cut into their profit. Minimizing the cost of storage or inventory, however, provides a strong and logical economic justification, considering the cost of money alone. The application of risk management will accommodate the manufacturers' inventory dilemma as well as stabilizing prices. It will end the boom and bust cycle by creating price stability in basic commodities. It also provides price transparency which helps market to become more efficient. Most significantly it lowers the cost to consumer by creating more competitive business environment The Risk Factor Risk is an element of uncertainty. Generally risks are typified as speculative or inherent; they are either static or dynamic. Risk management is a tool for removing the lack of knowledge about the type of risk. Risk is normally reduced or avoided by shifting it from, say, consumer to risk taker. A major risk in business is market risk. The market risk may generally be perceived as price, interest rate and currency exchange rate. Any movement in a price or rate will be undesirable to some market participants. Financial market innovations have sharply reduced many liquidity risks in recent years. Risk management, as a tool, can help minimize possible financial losses resulting from price changes. This technique is extensively used in futures industry. In all these cases formal exchanges facilitate the risk management by allowing the producer and consumer to transfer their business risk to risk takers.

Present Practices in Risk Management

Risk management has been, of course, addressed in some businesses through traditional commodity exchanges. The mechanism of risk management is generally based on certain products representing a broad spectrum of industries ranging from agricultural to mining and financial. At present a limited number of products traded in such exchanges serve as bench mark for pricing the underlying commodity of a given industry. Crude oil is an example for petroleum industry. The market liquidity is then largely dependent on such selected product It should be noted that the specific product selected even though fully researched does not guarantee of being the right one and many tries are made before a successful launch of a product is proven. This interpretation of product selection is generally based on criteria practiced in traditional commodity exchanges. The criteria for product selection, presently tailored for floor trading model, include size, volatility, source of public information (such as supply and demand), existence of dealer community and most important, the liquidity factor which is considered an essential element for risk management.

Based on such products financial instruments are designed. They are then used as the medium to shift financial risks. This implies that certain physical assets should be translated to financial instruments. The economic value of commodity trading, therefore, lies in its ability to transfer risk from the hedger (producer and consumer) to investors or risk takers. This is the basis for stabilizing price which accommodates a smooth supply chain within, say, the manufacturing community. The greatest achievement of financial instruments is to free, for example, manufacturer or supplier from commitment to holding contract until the goods are delivered or received at the expiration date. They can be traded as any other traditional securities Problem of Developing Products The extension of random product selection to other industries, as means of risk management tool, is difficult and costly due to several factors. Firstly, the number of products become limitless in, say, manufacturing as the value-added products continue to expand. Secondly, the dynamics of industry cause continuous changes in product specification and most important, the global trade requirements will render the existing rigid exchanges impractical for handling large number of products effectively. In contrast to standard contracts, non-standard contracts pose a higher risk for exchanges than standard contracts. Risks include those with bad credit (e.g., due to bankruptcy or foreclosure), non-performing contracts (e.g., late or non delivery of goods or non payment).

In view of the above; therefore what is needed is a system, method and computer program product for flexible products and contracts adaptable to risk management. Such a system would create a "marketplace" in which producers and consumers of these financial instruments as a means for managing their risk.

SUMMARY OF THE INVENTION

The present invention is a system, method, and computer program product for development of identifying those products that can be traded as financial instruments. In particular, the present invention provides flexible contracts based on generic root products transforming the root products into a financial instruments. As such, the present invention provides risk management and a resource for dissemination of information benefiting producers, consumers and. In this way, every individual involved in the manufacturing sector can access information stored in a marketplace trading manufactured products based on present invention.

One advantage of the present invention is global transparency of prices of key manufactured products leading to lowering consumer cost in consumer and durable goods.

Another feature of the present invention is that it reduces the amount of time and money when negotiating for the sale of a inter-manufacturing product which in turn reduces the cost of sale as well as cost of goods sold. This will ultimately reduce the cost of goods within manufacturing itself.

Another feature of this invention is the rationalization methodology upon which financial instruments as underlying commodity are developed. It is a computer assisted methodology that performs the selection process, market research and transformation of the root products into a financial instruments.

Another advantage of this invention is the ability of manufacturers to price their finished goods at market prices Another advantage of this invention is the ability of manufacturers to hedge their position when selling finished goods.

Another advantage of the present invention is that it archives information about the manufactured products and bid/ask information to be used to determine a true price for raw materials.

Further features and advantages of the invention as well as the structure and operation of various embodiments of the present invention are described in detail below with reference to the accompanying drawings.

BRIEF DESCRIPTION OF DRAWINGS

FIG. 1: Sector Analysis
FIG. 2: How the Pareto's Distribution Law is applied
FIG. 3: Root Extraction Process
FIG. 4: Existing Forward Platform
FIG. 5: New platform
FIG. 6: The general format of flexible, semi-standard contract
FIG. 7: Marketing Information; collection of market data as well as relevant news
FIG. 8: Supply & Demand data are collected in a database
FIG. 9: Manufacturer part number: A guide to technical specification
FIG. 10: Combining technical and marketing data
Table 11: Basis of availability of information
Table 12: Example of identifying key sectors; the table shows the type of information is collected in the database
Table 13: Identifying product key players (producers and consumers); the table shows the type of data collected in the database
Tables 14: General design of database for marketing information

DETAILED DESCRIPTION OF PREFERRED EMBODIMENT

Pre-amble: In a given marketplace there are generally two elements that define its degree of activity. The most obvious is what is usually traded. For example in the stock exchange equities are bought and sold. The second element is the public availability of information about the transactions. For example daily posting of all equity prices can be found in all daily publications. Such a marketplace is considered open market with varied degree of liquidity. In a "closed", and necessarily non liquid marketplace, such as auto business, neither the most actively traded autos nor any transaction prices is public information. Financial instruments facilitates transformation of a closed market to an open market.

Throughout this embodiment two fundamental principles are pursued. First, taxonomy is utilized to gain the domain knowledge and construct a "tree". Secondly, Pareto's Distribution Law is employed to extract the products that are most significant.

The process begins with an industry and a sector. The next steps are
Development of a taxonomy to gain domain knowledge for sector's products.
Identification of root products.
Establishing commonality of vendors specifications of such products.
The concurrent step is to track key data by:
Collecting prices of key products.
Compiling marketing information.
Indexing for related products prices.
The final stage is to design a financial instrument on the basis of available data
Identifying key root products.
Design a contract based on a root product 1. Sector Products In any stage of manufacturing where one state of material is transformed to another certain value is added to the original state. This "value-add" consists of material, labor, plant and equipment. In this analysis the material cost is considered the only variable element in measuring the value-add. Sector usually refers to similar or related "value-add" that belong in the same group.

As an example of such in-process material consider a steel mill. The pig iron is acquired as raw material from the ore owner. The steel sheet is produced which bears a known value add. Depending on the application the steel sheet will be used as next raw material for auto manufacturer. In each stage of transformation the manufacturing fixed cost not withstanding, the "raw" material is the element whose price movement directly affect the value-add. All such products are within the primary stage of steel making sector As another example, a utility company purchases electricity from power generation station and sells electricity at distribution level to municipality as raw material (the value-add is the cost of transmission and the step down substation). The municipality will sell electricity at kilowatt-hour rate to residential units (known value-add). The in-process-material, here refers to all value-added costs involving the transmission and distribution. The sector here refers to power distribution.

Fractal Analogy

By sectionalizing all manufacturing levels numerous value-add materials, both tangible and non tangible, can be discovered. For example in electronics manufacturing sector there are semiconductors, power, interconnect, opto-electronics, etc. The above process can go on until it reaches a stage from which no further value-add is realized.

For a targeted sector a "tree" is then constructed. The tree (trunk) represents major product groups of a sector. Each group is further analyzed to search for the root product. To avoid unnecessary and cumbersome job of listing all and every product throughout the process the principal of Pareto's (Distribution) Law, commonly known as 80/20 rule, is adopted as a convenient tool.

To begin the process the domain knowledge of a particular manufacturing sector is required. This is accomplished by sectionalizing the targeted manufacturing sector indefinitely (analogous to fractal concept in Chaos theory). In FIG. 1 several manufacturing sectors (chemical, electrical and electronics) are derived from block 001, the manufacturing sector. Electronics (block 0013) is then broken down to semiconductors, switches, opto-electronics, display, interconnect, (blocks, 00131 through 00135). This process continues until a base or root product is extracted.

Once a sector is identified its value-added products, based on the breakdown indicated in FIG. 1 are extracted. Referring to the diagram all products with unknown or custom made "value-add" are ignored. Only those products that are manufactured repetitively and their value-add is universally established are selected.

Sector's Analysis

Taxonomy is a logical hierarchical classification showing relationship among all the categories and reduces complexity. The taxonomy of manufacturing sector for analysis leads to the domain knowledge of the sector as shown below:

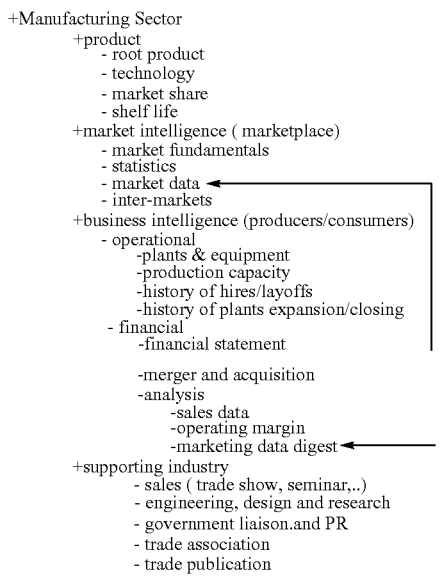

Product Analysis

For the targeted manufacturing sector first a "tree" is constructed. The tree branches represents product groups of that sector followed by sub-group (smaller branch) to ultimately arrive at the root product. To avoid unnecessary and cumbersome job of listing all and every product throughout the process the principal of Pareto's (Distribution) Law, commonly known as 80/20 rule, is adopted as a convenient tool. As an application of Pareto's Law the flow diagram (see FIG. 2) demonstrates how the selection of subgroup and sub subgroup of a product group can be made. The selection is based on the assumption that starting with a given group of product a handful of subgroup items are most dominant. Block 020 represents a list of or bill of materials used for a production line. Block 021 shows a group of related product items. The system calculates the Dollar value of the first item and checks if they represent 80% of Dollar amount. If not it fetches the next item and so on until the result is achieved. Once the "dominant" items have been selected the process of extracting the root product of each product begins.

The process of going from a general product to the root product involves several steps as shown in FIG. 3:

The first stage requires a full analysis of industry business sector with respect to its taxonomy of products as indicated by block 120. Block 110 represents a group of general, unidentified products. The next level involves development of a tree trunk for the sector, block 140. Such a trunk identifies all major products that branch out of the trunk of tree. Block 150 is another iteration of further branching to sub-sector, etc. Once all major branches are identified any targeted product can be traced to its root product.

Homogenization

After the branches and root products are identified, the search for commonality of specification begins. Block 160 represents sorting and comparing specifications of root and branches. The task is to explore root product with common specifications to arrive at a "homogenized" root product. Since the manufacturers continuously enhance their existing product and or develop new products to maintain or improve their market share continuous maintenance and updating of specification is required. The system's database in several steps updates, adds and removes items within the "listed" product table to maintain product currency.

The following describes a taxonomy of product and the methodology (steps A through F) needed for frequent update.

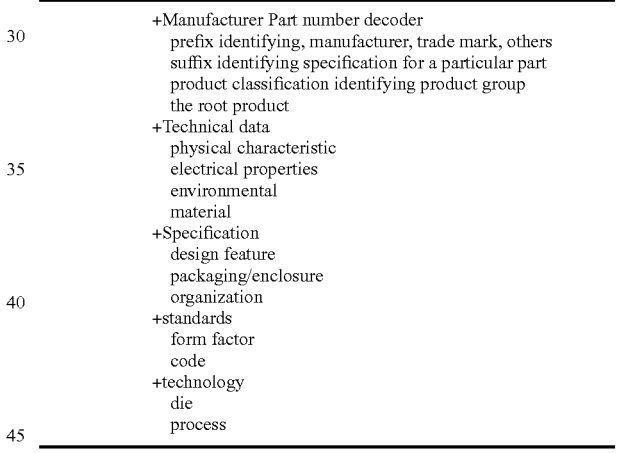

a) Starting with general product availability along with the list of vendors the following steps are required. Data about manufacturer's part numbering/coding and product category are stored in the database. The following steps are needed to extract the root:

Listing of all items taken from vendor
Identify vendor (using vendors code table in database)
Extract the preliminary root (base) product by identifying prefix and suffix
An example refers to FIG. 015: SN 74 F 373NT 1992
a. SN: Texas Instrument
b. Identify prefix:(prefix :74F)
c. Identify suffix: (NT 1992 : suffix)
d. strip b and c
e. Identify root code: (373)
f. Identify the root: (flip/flop)
g—Identify branch: (logic devices)
The Database will contain:
1. vendor reference (name, products relevant to selected group, product code)
An example is provided in the following table:

| vendor | product group | product code |
|---|---|---|
| mosel vitelic | dram | v53c |
| mosel vitelic | sram | ms62 |
| texas instrumets | logics | sn74 |
| micron | dram | mt4 |
| nec | dram | mupd42 |

2. product coding (prefix-base-suffix-other).

| vendor | product part number | prefix | base | suffix | other |
|---|---|---|---|---|---|
| mosel vitelic | v53c404B p60L | v53c | 404 | Bp60L | |
| texas instr. | SN 74 F 373NT 1992 | SN 74 F | 373 | NT | 1992 |
| nec | MUpd$_{424400}$ $_{LE70A}$ | mupd42 | 4400 | LE70A | |
| micron | mt4c4001j | mt4c | 4001 | J | |
| hyundai | hy514400b | hy51 | 4400 | b | | b) Temporarily store the item within the pre-defined group, sub-group, etc. In the above example: flip/flop, main branch (group), sub-branch 1-2-1-1-x, etc.

c) compare specifications (including technical data) for different vendors To do this a database is designed to capture, store and retrieve all the relevant technical data available by the vendors. This is the critical database that will be the genesis of product specifications review and matching.

To accomplish that a parent/child relational table is designed: item (child) ID/parent ID

| DEFINITION OF ID AND ITS PARENT ID | | |
|---|---|---|
| ID | description | parent ID |
| an item/entity | what it is | contains that item / other parents |
| sample | sample | sample |
| cmos | technology employed | technology |
| technology | engineering basis | technical data sheet |
| technical data sheet | technical specification | specification |
| fast page mode | rapid access | speed |
| 4mx4 | byte size in bits | organization |
| 18 pin | number of connections | Pin count |
| pin count | number of pins | physical properties |
| physical properties | appearance of product | specification |
| soj | method of enclosing | packaging |
| packaging | technique used for enclosing | physical properties |
| 0603,0805,1206 | EIA code for sizing | type |
| type | identify the prod. by standard code | physical properties |

The following examples demonstrate the way the initial product were selected as fitted into the ID/PARENT ID FORMAT:
GROUP 1-Integrated Circuits (IC)
ID: IC, Parent ID: electronics device
subgroup 1: memory devices
ID: memory device, Parent ID: Integrated Circuit devices
Sub-subgroup 1-1-1: dram
ID: dram, Parent ID: memory devices
Sub-sub-subgroup 1-1-1-1:
1mx1, cmos, fast page mode, 60 ns, 5v
ID: CMOS , Parent ID: technology
ID: fast page mode, Parent ID: speed
ID: 5 v, Parent ID: technical data
ID: 1mx1 , Parent ID: organization
ID: 60 ns, Parent ID: access time
sub-sub-subgroup01-1-1-1-1 :
ID:18 pin, Parent ID: Pin count
ID: dip, parent ID: packaging
Sub-subgroup 1-1-2 : sram
ID: sram, parent ID: memory devices
Sub-sub-subgroup 1-1-2-1
item: sram, 32kx 8
ID: BiCMOS , parent ID: technology
ID: 128kx8, parent ID: organization
ID: plastic dip, parent ID: packaging
ID: 5 v, parent ID: technical data
ID: async, parent ID: technical data sheet
ID: 32 pin, parent ID: pin count
sub-sub-subgroup 1-1-2-1-1:
ID: 20 ns, parent ID: access time
subgroup 1-2, logic
ID: logic devices, Parent ID: Integrated Circuit
item: 74hc00, nand gate
sub-subgroup 1-2-1 : cmos logic
ID: cmos, parent ID: technology
ID: 74hc series, parent ID: type
ID:00, parent ID: designated code
ID: −55 to 125 c, parent ID: physical properties
ID: soic, parent ID: packaging
sub-sub-subgroup 1-2-1-1-1 :
Next, retrieve the stored item : compare and update specification:
   a. Identify part ID against manufacturer
   b. Identify part ID against production date
   c. Compare part ID against new revision
   d. update product table
   d) Measuring the degree of relative importance of products
The system first lists all items required, say, for purchasing. It then utilizes Pareto's Law to determine the major or key purchases. The steps are as follows
   i. Identify base product of a sub-group and exclude all quantities less than lot size of the subgroup
   ii. Calculate total purchase, both spot & contracts by multiplying quantity and price
   iii. Take 80% of (ii)
   iv. Sort on the order of highest value, that is, quantity times purchased price.
   v. Add items downward until the total approaches or equals the figure obtained in (iii). The total number of items will then signify the key items. It should be around 20% of all items.
If the result is not satisfactory proceed with another iteration as follows:
Tabulate the items that have produced the above figure.
If total of selected items is greater than 20% of total numbers add 20% of items downward.
Calculate subtotal value.
If total is less than 80% of total add items downward until total approaches 80%
Repeat above steps until 20% is reached within approximation.
   vi. List the items

EXAMPLES

As an example consider purchase (bid) of goods.
Begin with subgroup 1-2 (logic devices of integrated circuit group) : 74F273, 74F 00, 74F11, etc . . . are all root products,
10,000×$1.50+14,000×$1.20+ . . . =$40,000 of subgroup 1-2

$40,000×0.8=$32,000

There are 10 items of subgroup 1-2,

The first two items total value ~$32,000?

If not add the next item of list

As a result three products are selected : 74F 373, 74F 11, 74 F00

As another example list all items offered for sale (spot and contracts)

Follow an identical approach to purchase example

As this process continues and the listed items are tallied those products that appear most frequently in the lists would have the highest relative strength.

e) Add the stored item if (c) and (d) are satisfied f) update or delete items based on last technical data revision, including phase-out and obsolescence.

Root Product Specification

The full specification of the root product (as generic product) is now updated and is "attached" to the root product. This is indicated as in FIG. 3, block 170. The root product is now generically specified.

Some products are the key root products; also known as standard products. The remainder are known as semi-standard products based on generic root product. Any semi standard product must contain a generic root product to be defined as such. This is further explained in Section 3. FIG. 5 shows how the invention utilizes the generic root product to create a semi-standard contract.

2. Sector Market Research

Business Intelligence

The bulk of business intelligence will be extracted and updated from filtered news sources (routinely published via the Internet). An intelligent agent filters the required content, based on dynamically changing key phrases. Once a manufacturing sector is determined a complete list of suppliers and consumers of that sector is compiled.

The following research data will be collected for further support and verification as shown in FIG. 7. The process for collecting public data is described below Identification of suppliers and key consumers are generally available in exchanges that categorize the listed companies based on industry sector.

suppliers marketing and sales information will be best obtained by analyzing company's financial reports. Direct access to marketing and sales require prior relationship. Some general data (mostly historical) is available through trade associations and publications performance measurement based on financial analysis is only a guess work done by investment banking industry performance based on trade is only available through credit agencies based on company's borrowing history performance based on people and management changes is easily available from news agencies and companies public relation departments Table 11 summarizes the extent of free publicly available information. Fee based services such as market research organizations can always be used as secondary source Database Engine For database design refer to tables 12, 13 and 14. Producers of such group and or subgroup, sub-subgroup will be identified and the tables will be constructed as follows:

A) Company name, group ID, web site, physical location, contact, etc

B) Name, group ID, key product1, key product 2, etc (totaling 80% rev), date

C) Group ID, total quantity product 1, total quantity product 2, etc.

D) Group ID, total quantity product 1, total quantity product 2 for sales

E) Commodity 1, Commodity 2, commodity 3—for each commodity % of revenue contribution or % contributed to cost of goods should be indicated F) For a conglomerate: total revenue, breakdowns of major sectors (e.g, electronics, memories, etc)

G) For producers sales data from financial statement: Company name, group ID, last quarter sales, last year sales, last 3 years acc. sales H) Repeat (A) for product 1 (include breakdown of subgroup, sub-sub-group and market share)

I) Repeat (A) for product 2,

J) Repeat (A) for product 3,

Market Intelligence

After the business intelligence is established and players are identified and the general criteria for researching a product is reviewed the market analysis for the specific sector begins. Referring to FIG. 10 the key data for analysis are:

a) market size (Total Available Market). This is shown as block 0131 b) market data availability (or accessibility)—This feature implies the existence of an open market where the data about the prices and availability (supply) can easily be ensured. This is depicted in blocks 0134 and 01311.

c) cash market size-Product's cash market is a pre-requisite for selecting the product. Such product ensures that the potential for its forward price liquidity would inherently exist.

d) Multi-currency trade—Each product is traded in a market's local currency. This implies that the normal daily fluctuation of the marketplace's currency will be added to the already existing market fluctuation of the product.

The next step involves a comprehensive collection of data about products. FIG. 013 is again used to demonstrate the flow of information for specific product market analysis.

Data Analysis

The process of collecting information is most time sensitive. In today's wired world the timeliness of information is more important than the content detail, or full accuracy.

Generally, there will be two distinct sources that would define the required data as shown in FIG. 8. The key components of supply are shown as blocks 0124, 0125, 0126, 0127 and 0128. Those of demand are shown as blocks of 01292 through 01295. Aggregation takes place as regional and sector level shown as 01296 through 01299 to collectively provide the News relevant to market data.

The repository engine shown in FIG. 9 allows the database engine process the following information:

i) identification of key product data for a given entity

Most entities normally disclose such data along with their publicly available financial data. Otherwise data is indirectly collected via products aggregate market share.

ii) compile shipped products

Individual supplier normally does not supply such data, but it is possible to collect and estimate aggregated data based on supplier's market share, revenue reported and average selling price.

iii) compile prices

Prices are assumed to be available because open market exists for such products. In absence of open market the average selling price(ASP) can be derived from aggregated shipped products based on reported revenue.

The information retrieved from database engine will further generate the following research data to verify the producers rating once the products are identified Identification of suppliers and key consumers performance measurement based on financial analysis people and management changes Database updates will be made using continuous data feed supplied by data vendors 3. Financial Instruments Referring back to FIG. 5 the first step assumes that the root product is already extracted as shown in block 2. Such product is fed with a generic specification, block 12 derived from industry standards. The next step can split into two choices: (i) the Root product is sufficiently general to fit the standard contract with general conditions, block 4. In this case the contract will be interpreted as financial instrument, block 7. This kind of financial instrument can be traded in any conventional exchange. This means such a contract when traded in the platform can be traded in a multi-lateral manner instead of bilateral implying that it is "tradable" at any time between any two parties. (ii) the Root product is not quite standard implying that some conditions of general contract will have to be modified as shown in block 3. FIG. 5 flow diagram shows that in this case the original forward contract, block 11 is now modified to represent a semi-custom contract. Such flexible semi standard contracts, encompassing most value-added products, are then transformed to financial instruments.

The main characteristics of a financial instrument's contract, is shown in FIG. 6. These elements indicate the generalized condition of contracts between buyer and seller.

The second column represents the major properties of the contract. The third column shows dependency on the product being traded and the marketplace where it trades. This results in frequent changes of the contract terms and conditions as stored in database. This means for each specific root product and marketplace the third column changes accordingly. For example if product changes from memories to wet chemical and from Japan marketplace to Germany the following changes take place in the third column:

a) kilogram instead of units b) 1000 liters instead of 100 units c) Euro instead of Japanese Yen d) tick value (minimum fluctuation) 1 point instead of 5 e) marketplace (Frankfurt instead of Tokyo)

f) daily limit (5% instead of 10%)

g) initial margin (10% instead of 15%)

h) 130 days or calendar date instead of standard multiples of 30 days

As product is specified, the system will update or adjust the contract property for lot size. For a contract with physical delivery, the contract replaces the product's generic specification with exact specification. It also adjusts the daily limit and performance bond required for the contract. In this manner a general condition of contract is modified to reflect a particular condition of contract as reflected in a typical forward contract. The semi-custom (or semi-standard) contract is universal implying that it can be used in different marketplaces and in different environment. The main characteristics simply change as key factors such as product, delivery date, etc. change.

Transforming a Non-Standard Bi-Lateral Contract to Semi-Standard Financial Instrument The present practice in buying and selling in manufacturing is routine. A consuming manufacturer enters into a purchase "contract' with a selected producer either directly or through an authorized distributor. Such contract is an agreement between two parties as shown as block 1 in FIG. 4. based on a fully specified physical material. It is a typical forward contract which spells out particular conditions and terms including material specification, price and delivery term. These known value-add materials defined as "Products" are of two types:

A) Standard

Starting with FIG. 4 the most obvious case is that of standard product as shown in block 11 which generally bears standard specifications. An example will be Heating Oil #2. Standard products accept no change in specification and have unlimited life span. Standard products have the advantage of being incorporated into standard contract shown as block 2. These contracts are interchangeable and can repetitively be used between any two parties in trading environment. In this case if two parties enter into a forward contract for most standard products (for same) is a matter of calculating the equivalent of futures contracts to the exact quantity of contract and delivery terms to secure a "hedged" position as risk management tool; hence eliminating any potential risk as indicated in block 3. If the product is a derivative of underlying commodity an indexing procedure may be required to arrive at correct number of contracts. An example will be trading of fuel oil #6 based on the underlying commodity, namely, heating oil #2.

B) Semi-Standard

A non standard product, appear as forward contract shown in block 1. It represents any product for any application which may or may not be repetitive. The non standard products generally result in non standard contract. A non-standard product or contract, shown as block 4, can not be interchanged, but it can be "managed" by a dealer who would guarantee the contract between the two parties under certain terms between each party and himself. In effect, the dealer assumes certain financial risk in case of default by either party. He has two choices for managing his own risk:

i) Block 51 refers to a possible availability of open market for the underlying commodity. This is the case of a derivative. The example is a jeweler who manufactures gold ring. The underlying commodity, standard gold is traded in open market. In this case the dealer is able to "hedge" his position based on certain index.

ii) Block 52 refers to most common case that there exists no open market for the underlying commodity and the dealer is financially at risk. If either party defaults on such contract the only remedy is legal action by the injured party.

iii) The invention offers the semi-standard financial instrument as an efficient approach to trading practice.

FIG. 5 shows how the new invention, a semi-standard financial instrument behaving as a financial instrument for a given product works. These flexible semi standard contracts encompass most value-added products; they are constructed based on generic root products which, in turn, act as standard products.

The root products when traded in an open market exhibit all the characteristics of an underlying commodity such as universal price transparency. Based on such data the indexing procedure, as described below, can be used to calculate all relevant value-added products.

4. Price Indexing

Index represents composite value of a group of items. Generally an index devisor is the sum of items divided by 100. Upon calculating devisor price indexing will be possible for all relevant products that are all in the same class

Index Calculation

In concept, the Producer Price Index is calculated according to a modified Laspeyres formula:

$$I = (\Sigma Q_a P_i / \Sigma Q_a P_o) \times 100$$

where:
$P_o$ is the price of a commodity in the comparison period;
$P_i$ is its price currently; and
$Q_a$ represents the quantity shipped during the weight-base period.

An alternative formula more closely approximates the actual computation procedure:

$$I = [(\Sigma Q_a P_o (P_i / P_o)) \Sigma Q_a P_o] \times 100$$

In this form, the index is the weighted average of price relatives, i.e., price ratios for each item ($P_i/P_o$). The expression ($Q_a P_o$) represents the weights in value form, and the P and Q elements (both of which originally relate to period "a" but are adjusted for price change to period "o") are not derived separately. When specifications or samples change, the item relatives must be computed by linking (multiplying) the relatives for the separate periods for which the data are precisely comparable.

Footnotes

Information currently used for calculating weights throughout the PPI family of indexes is largely taken from the following censuses conducted by the Bureau of the Census of the U.S. Department of Commerce: (1) *Census of Manufactures*; (2) *Census of Mineral Industries* (which includes oil and gas production); (3) *Census of Agriculture*; and (4) *Census of Service Industries*. Other current weight sources include the Energy Information Administration of the U.S. Department of Energy and the National Marine Fisheries Service of the U.S. Department of Commerce.

A general description of how seasonal adjustment procedures are typically applied at BLS is given in appendix A at the end of this *Handbook*.

See "On the Use of Intervention Analysis in Seasonal Adjustment" by J. A. Buszuwski and S. Scott, *Proceedings of the Business and Economics Section*, American Statistical Association, 1988.

Procedure to Calculate Indexes

A) To calculate index of a group based on sub-sector, sub-sub-sector, . . . root:
   specify a product group (sector)
   expand the entire breakdown (build the tree)
   calculate total available market(TAM) for each subgroup, sub-subgroup, etc in dollars
   determine TAM for traded product items in dollars
   determine closing spot (ideally forward) prices for each item
   if TAM is not available calculate TAM by multiplying shipped quantity at spot price
   calculate the change in index for a given period (delta * previous index)
   use simple average for calculating each sub-subgroup, sub-group and group index An example for calculating TAM is shown below:

| Products traded in group | Market share (sub-subgroup) | TAM | Market share (subgroup) | TAM | Market share (group) | TAM |
|---|---|---|---|---|---|---|
| 4Mx16 SDRAM | 65% | 14,000,000,000 | 70% | 20,000,000,000 | 70% | 30,000,000,000 |
| 4M flash | 50% | 1,500,000,000 | 50% | 3,000,000,000 | 10% | |
| 128k SRAM | 40% | 960,000,000 | 80% | 3,000,000,000 | 10% | |

The final table will look like this. A detailed example for memories is shown in a detailed example

| Product traded | description | root index | Sub-subgroup index | Sub-group index | group index |
|---|---|---|---|---|---|
| 4Mx16 SDRAM | Memory | sdram, 64m: 62.3 16m: 43.33 128m: 73.16 | SDRAM: 66.68 EDO: 50.86 FPM: 47.05 | DRAM: 62.20 SRAM: 45.90 FLASH: 44.66 | All Memories 59.13 |
| 0805 X7R | Ceramic cap | X7R, 0805 4.7 mf, 50v | X7R, NPO, . . . | GP ceramic | All capacitors |

B) Calculating the index of inter-related products (within the root)
   1. list all similar items within the cell index
   2. gather closing spot prices for each item at a given time
   3. gather aggregated shipment for above date
   4. calculate sum of shipment multiplied by spot closing. This is the volume
   5. divide volume for aggregate shipment to get average price
   6. divide volume at t1 (period one) by that at t0 (period proceeding that) and multiply by 100 to get Index Designing the table;
list previous prices of related products, then calculate the delta and multiply that
- column 1: product id, related prod. 1,2,3,4 ...
- column 2: product id, product price change, related product price
- column 3: product id, related group product prices 1,2,3, formula

| Targeted commodity | Commodity traded | Current closing price of traded commodity | Previous closing price of traded commodity | Targeted Commodity last price | New targeted comm.. price/formula |
|---|---|---|---|---|---|
| P1: 1Mx16 MB, EDO, 50ns, SOP | P:1Mx16 MB, EDO, 50 ns, DIP | $4.25 | $4.35 | $4.65 | 4.6 |
| P2: 4Mx4 EDO, 50 ns, DIP | As above | $4.25 | $4.00 | $4.65 | 4.81 |
| P3: 1mx16 SDRAM, DIP | As above | $4.25 | $4.75 | $5.00 | 4.75 |
| P4: 16mx1, FPM, 60ns, DIP | As above | $4.25 | $5.00 | $5.00 | 4.625 |

Formula applied: $4.65 - ($4.35-$4.25)* $4.65 = $4.60 ...
Product P average closing price for period T1 = $Z_{t1}$
Product P previous average closing price for period T2 = $Z_{t2}$
Delta $(Z_{t2} - Z_{t1})$ = [w]
Product P1 last price for period X = Z1
Product P1 adjusted price for period X = Z1 + Z1[w]
[ ] indicates absolute value 5. Examples Building a Domain Knowledge for a Given Sector The task is to analyze the business, product and market intelligence of the sector.

a) The first step is to review manufacturing classification (such as SIC) as provided by the US Government (1993 figures):

MAJOR MANUFACTURING SEGMENTS

| Industry | public co's | private co's | 1993 sale | top 1000 | SIC |
|---|---|---|---|---|---|
| Computer | 208 | 1150 | 140b | 29 | 3571 |
| Electronics | 252 | 1200 | 300 | 14 | 3672/79 |
| Chemical & plastics | 105 | 1100 | 115 | 42 | 2812/99 |
| Pharmaceutical | 156 | 800 | 125 | 27 | 2831/65 |
| Refinery products | 28 | 390 | 320 | 18 | 2911 |
| Pulp & paper | 51 | 950 | 62 | 32 | 2611/76 |
| Tire & rubber | 6 | 600 | 21 | 13 | 3011/69 |
| Ferrous metals | 49 | 920 | 23 | 17 | 3312/35 |
| Non ferrous metals | 36 | 1150 | 36 | 11 | 3334/57 |
| Electrical | 56 | 750 | 130 | 10* | 3612/48 |
| Glass | 10 | 200* | 13 | 2 | 1793 |
| Textile | 48 | 400 | 20 | 8 | 2235/59 |
| Transport Eq. | 11 | 200* | 5 | 2 | 3799/5088 |
| Total | 1016 | 9810 | 1046 | 225 | | b) Next, it will be important to determine the relative importance of these manufacturing sectors as determined by statistical data.

| INTERMEDIATE GOODS | relative importance % |
|---|---|
| 1. commercial electrical power | 4.197 |
| 2. industrial chemical | 4.052 |
| 3. motor vehicle parts | 3.780 |
| 4. industrial electrical power | 3.249 |

-continued

| INTERMEDIATE GOODS | relative importance % |
|---|---|
| 5. steel mill products | 3.198 |
| 6. fabricated structured metal products | 2.899 |
| 7. electronics components | 2.668 |
| 8. misc metal products | 2.244 |
| 9. plastic, resins | 2.002 |
| 10. paper board | 1.260 |
| 11. paper boxed and containers | 2.165 |
| 12. paper | 2.077 |
| 13. finished fabrics | 1.137 |
| 14. jet fuel | 0.926 |
| 15. prepared print | 0.878 |
| 16. #2 diesel fuel | 0.840 |
| 17. processed yarn & thread | 0.734 | c) The product intelligence is derived from extracting the key products as detailed in the embodiment. The products are highly sectionalized and a specific group is being studied. The following tables are based on semiconductors as a sub-sector of electronics sector.

Selected Sub Sector Product Pricing Data

| product | date | closing |
|---|---|---|
| SDRAM 32mx4 | Dec. 4, 2000 | $ 8.00 |
| SDRAM 1mx16 | Dec. 4, 2000 | $ 3.75 |
| EDO 8mx8 | Dec. 4, 2000 | $12.00 |
| FPM 8mx8 | Dec. 4, 2000 | $13.50 |
| FPM 16mx4 | Dec. 4, 2000 | $12.50 |
| FPM 4mx16 | Dec. 4, 2000 | $14.95 |
| EDO 16mx4 | Dec. 4, 2000 | $16.50 |
| FPM 4mx4 | Dec. 4, 2000 | $ 5.50 |
| SDRAM 8mx16 | Dec. 4, 2000 | $ 7.20 |
| EDO 4mx16 | Dec. 4, 2000 | $ 5.25 |
| FPM 1mx16 | Dec. 4, 2000 | $ 4.75 |
| SDRAM 4mx16 | Dec. 4, 2000 | $ 4.00 |

-continued

| product | date | closing |
|---|---|---|
| SDRAM 16mx4 | Dec. 4, 2000 | $ 3.75 |
| FPM 16mx1 | Dec. 4, 2000 | $ 3.75 |
| SDRAM 16mx8 | Dec. 4, 2000 | $ 6.85 |
| EDO 4mx4 | Dec. 4, 2000 | $ 4.55 |
| FPM 4mx16 | Dec. 19, 2000 | $ 4.00 |
| EDO 16mx4 | Dec. 19, 2000 | $11.50 |
| EDO 16mx4 | Dec. 19, 2000 | $14.75 |
| SDRAM 16mx4 | Dec. 19, 2000 | $ 3.75 |
| SDRAM 32mx4 | Dec. 19, 2000 | $ 7.75 |
| SDRAM 4mx16 | Dec. 19, 2000 | $ 3.50 |
| SDRAM 8mx16 | Dec. 19, 2000 | $ 7.00 |
| SDRAM 16mx8 | Dec. 19, 2000 | $ 6.75 |
| EDO 16mx4 | Dec. 19, 2000 | $ 4.75 |
| FPM 16mx1 | Dec. 19, 2000 | $ 3.25 |
| FPM 1mx16 | Dec. 19, 2000 | $ 4.75 |
| EDO 4mx4 | Dec. 19, 2000 | $ 4.00 |
| FPM 4mx4 | Dec. 19, 2000 | $ 4.50 |
| SDRAM 1mx16 | Dec. 19, 2000 | $ 3.25 |
| FPM 16mx4 | Dec. 19, 2000 | $12.00 |
| FPM 8mx8 | Dec. 19, 2000 | $13.00 |
| SDRAM 8mx8 | Jan. 9, 2001 | $ 2.68 |
| EDO 1mx16 | Jan. 9, 2001 | $ 3.70 |
| SDRAM 16mx8 | Jan. 9, 2001 | $ 5.65 |
| SDRAM 1mx16 | Jan. 9, 2001 | $ 3.30 |
| SDRAM 32mx4 | Jan. 9, 2001 | $ 6.25 |
| EDO 4mx16 | Jan. 9, 2001 | $10.90 |
| SDRAM 8mx16 | Jan. 9, 2001 | $ 6.17 |
| FPM 16mx1 | Jan. 9, 2001 | $ 3.75 |
| SRAM 128kx8 | Jan. 9, 2001 | $ 4.50 |
| SRAM 512kx8 | Jan. 9, 2001 | $ 9.70 |
| SDRAM 4mx16 | Jan. 9, 2001 | $ 3.15 |
| EDO 4mx4 | Jan. 9, 2001 | $ 3.90 |
| EDO 8mx8 | Jan. 9, 2001 | $12.50 |
| FLASH 29F040 | Jan. 9, 2001 | $ 6.00 |
| FPM 16mx4 | Jan. 9, 2001 | $12.00 |
| SDRAM 16mx4 | Jan. 9, 2001 | $ 3.45 |
| FPM 8mx8 | Jan. 9, 2001 | $13.50 |
| FPM 4mx4 | Jan. 9, 2001 | $ 4.00 |
| FPM 1mx16 | Jan. 9, 2001 | $ 4.50 |
| EDO 16mx4 | Jan. 9, 2001 | $10.80 |
| SRAM 32kx8 | Jan. 9, 2001 | $ 1.85 |
| FLASH 29F010 | Jan. 9, 2001 | $ 4.60 | d) The business intelligence requires the knowledge of producers and consumers of products described above. For each entity the key products revenue contribution is estimated.

Each entity is identified with its key product contribution

| ID | company | year | revenue | electronics | memory |
|---|---|---|---|---|---|
| 12 | Fujitsu | 2001 | $ 20,000,000.00 | $2,500,000,000. | $1,400,000,000. |
| 11 | Fujitsu | 2000 | $ 20,000,000.00 | $6,400,000,000. | $3,000,000,000. |
| 16 | Hitachi | 2001 | $ 66,000,000.00 | $4,180,000,000. | $840,000,000.0 |
| 15 | Hitachi | 2000 | $ 67,000,000.00 | $6,860,000,000. | $1,850,000,000. |
| 14 | Hynix | 2001 | $4,600,000,000. | $4,600,000,000. | $2,000,000,000. |
| 6 | Hynix | 2000 | $ 0.00 | $8,100,000,000. | $6,800,000,000. |
| 4 | Infineon | 2000 | $6,500,000,000. | $3,000,000,000. | $2,700,000,000. |
| 5 | Infineon | 2001 | $5,100,000,000. | $1,400,000,000. | $1,300,000,000. |
| 18 | matsusita | 0 | $ 0.00 | $ 0.00 | $ 0.00 |
| 1 | micron | 2000 | $6,500,000,000. | $6,000,000,000. | $6,000,000,000. |
| 2 | micron | 2001 | $3,800,000,000. | $2,700,000,000. | $2,200,000,000. |
| 22 | micron | 2002 | $2,589,000,000. | $2,589,000,000. | $2,589,000,000. |
| 13 | Mosel Vitelic | 2000 | $780,000,000.0 | $780,000,000.00 | $500,000,000.0 |
| 8 | NEC | 2001 | $ 42,000,000.00 | $7,500,000,000. | $3,000,000,000. |
| 7 | NEC | 2000 | $ 45,000,000.00 | $11,000,000,000. | $4,500,000,000. |
| 19 | oki | 0 | $ 0.00 | $ 0.00 | $ 0.00 |
| 21 | philips | 0 | $ 0.00 | $ 0.00 | $ 0.00 |
| 31 | Samasung | 2000 | $ 33,000,000.00 | $8,700,000,000. | $7,500,000,000. |
| 20 | st | 0 | $ 0.00 | $ 0.00 | $ 0.00 |
| 10 | Toshiba | 2001 | $ 46,000,000.00 | $8,900,000,000. | $1,500,000,000. |
| 9 | Toshiba | 2000 | $ 50,000,000.00 | $13,000,000,000 | $2,400,000,000. |

For an entity, product 1, product 2, and product 3 with percentage of sales contribution is shown.

| corporation | Commodity 1 | commodity 2 | commodity 3 |
|---|---|---|---|
| amd 2002-2003 | cpu, 65% | flash, 27 | IC, 8% |
| amd, 2000-2001 | cpu, 49% | flash, 39% | IC, 8% |
| atmel | flah, 28% | eeprom, 15 | mcu &logic, |
| fairchild semi | discrete, 42% | logic, 24% | analog, 22% |
| hitachi | memories 20% | mcu, 30% | display, 30% |
| infineon | memory, 30% | wireless | automotive, 25 |
| INTEL, 2000-2001 | cpu, 80% | flash | chipset |
| micron | dram, 87% | flash, 3% | sram, 2% |
| NEC, Electron | semi. 82% | display 11% | component |
| on semi | logic | wireless comm | |
| philips | ic's, 18% | passives, 11% | lights, 14% |
| texas instrument | logic | dsp | asic, sparc |

For each entity key commodities are identified

| corporation | commodity | commodity | commodity |
|---|---|---|---|
| comoaq | semiconduct | storage | display |
| dell | semi | storage | display |
| gateway | semi | storage | display |
| nortel | dsl | router | |
| solectron | semi | pcb | disk array |
| sun | sparc, TI. | storage | display. |

For each entity key currency transactions are identified with percentage of each

| corporation | currency 1 | currency 2 | currency 3 |
|---|---|---|---|
| apple | eu 33% | japan, 8% | asia-pac, 5% |
| atmel | eu, 32-34% | asia-pac. | Japan, |
| compaq | eu, 40% | | |
| dell | Yen, 5% | Cad, 10% | Eu, 7% |
| fairchild | Asia-Pac, 52% | peso. | korea, 18% |
| infineon | eu, 50% | asia-pac. | usd, 24% |
| intel | eu, 24% | asia-pac. | japa, 9% |
| micron | eu, 17% | asia-pac. | japa, 3% |
| philips | usd 20% | asia-pac. | la, 3% |
| sun | ven20% | euro20% | bp20% | e) Marketing intelligence consists of aggregated data so compiled, as shown in Tables 12 and 13.

Table 12 identifies sub sector's aggregate market size, the growth rate, etc. The table showing the number of entities refer to producers. Similar data can be derived from consumer side.

Table 13 shows the producers and consumers of products along with the related market data. The first column shows a producer followed by a consumer of semiconductor sector of electronics business. It further shows that producer's and consumer's commodity index (memories) are common, but each with different contributing factor to their operating margin (derived from revenue and cost of goods sold).

f) Price indexing calculation for a group begins with:

SUB-SUB-SUBGROUP: 128 M

```
         0.8lb      0.4b      0.2b       0.1
          |          |         |          |
        32mx4      16mx8     8mx16    others (pc133, ddr, rd)
```

|  | 32mx4 | 16mx8 | 8mx16 |
|---|---|---|---|
| Dec. 4, 2000 closing spot | $8.00 | $6.85 | $7.20 |
| shipped before previous change: | 25000 | 10000 | 7500 |
| Dec. 19, 2000 closing spot | $7.75 | $6.75 | $7.00 |
| shipped this period | 18000 | 7500 | 6000 |

AVERAGE PRICE FOR 128m: $7.375
Previous average price: $7.589
index of
128m = 100(18000 * 7.75 + 7500 * 6.75 + 6000 * 7)/(25000 * 8 + 10000 * 6.85 + 7500 * 7.2) + 73.18

SUB-SUBGROUP BREAKDOWN OF 64 M

```
SDRAM    EDO    FPM    others(pc 66, pc133, ddr)
```

SUB-SUB-SUBGROUP: 64 MB SDRAM (cell index)

```
        2.5b      1.5 b     1b       1.5b
       4MBx16    16MBx4    8MBx8    OTHERS
```

|  | 4MBx16 | 16MBx4 | 8MBx8 |
|---|---|---|---|
| shipped in previous period | 75,000 | 30,000 | 20,000 |
| shipped in this period | 55,000 | 20,000 | 10,000 |
| closing spot as of Dec. 4, 2000 | $4.00 | $3.75 | $4.25 |
| currently as of Dec. 19, 2000 | $3.50 | $3.75 | $4.25 | average price for 64 M: $4.05;
previous average price: $3.98
I = 100(55000 * 3.5 + 20000 * 3.75 + 10000 * 4.25/75000 * 4 + 30000 * 3.75 + 20000 * 4.25) = 62.3

SUB-SUB-SUBGROUP: 64 MB EDO

```
       4mx16     8mx8     16mx4     other
```

|  | 4mx16 | 8mx8 | 16mx4 | other |
|---|---|---|---|---|
| closing spot on Dec. 4, 2000: | $5.25 | 12 | 16.50 | na |
| shipped previous. | 25,000 | 7000 | 6000 | na |
| closing spot on Dec, 19, 2000: | $4.75 | 11.50 | 14.75 | na |
| shipped this period | 15000 | 5000 | 4000 | na |

I = 100(15000 * 4.75 + 5000 * 11.5 + 4000 * 14.75)/(25000 * 5.25 + 7000 * 12 + 6000 * 16.5) = = 59.74
Average price for 64 EDO on Dec. 4, 2000 $8.27
Average price for 64 EDO on Dec. 19, 2000 $7.82

SUB-SUB-SUBGROUP: 64 MB FPM

```
       4mx16     8mx8     16mx4     other
```

|  | 4mx16 | 8mx8 | 16mx4 | other |
|---|---|---|---|---|
| closing spot on Dec. 4, 2000 | $4.95 | $13.50 | 12.5 | na |
| shipped | 15000 | 7000 | 5500 | na |
| closing spot on Dec. 19, 2000 | $4.00 | 13.00 | 12 | na |
| shipped | 10000 | 5000 | 2000 | na |

I = 100(10000 * 4 + 5000 * 13 + 2000 * 12)/(15000 * 4.95 + 7000 * 13.5 + 5500 * 12.5) = 54.31?
Average price on Dec. 4, 2000 $8.64
Average price on Dec. 19, 2000 $7.58

SUB-SUBGROUP 16 M breakdown

```
 EDO     FPM     SDRAM     other
```

SUB-SUB-SUBGROUP: 16MB EDO
Index for 16 m EDO

```
      0.5b      0.2b     0.3b
     1mx16      4mx4    others
```

|  | 1mx16 | 4mx4 | others |
|---|---|---|---|
| previous closing spot: | $3.75 | $4.55 | $3.5 |
| shipped then | 25,000 | 12,000 | 15,000 |
| Dec. 19, 2000 spot | $3.75 | $4.00 | $3.5 |
| shipped in this period | 18,000 | 8,000 | 10,000 | average price for 16 M: $3.74
previous average price = $3.86
I = 100(18000 * 3.75 + 8000 * 4 + 10000 * 3.5/25000 * 3.75 + 12000 * 4.55 + 15000 * 3.5) = 66.98

SUB-SUB-SUBGROUP: 16 M FPM

|  | 1mx16 | 16mx1 | 4mx4 | other |
|---|---|---|---|---|
| closing spot Dec. 4, 2000 | $4.75 | 3.75 | 5.50 | na |
| shipped | 30,000 | 15000 | 12000 | na |
| closing spot Dec. 19, 2000 | $4.75 | $3.25 | 4.5 | na |
| shipped | 18000 | 7500 | 8000 | na |

I = 100(18000 * 4.75 + 7500 * 3.25 + 8000 * 4.5)/(30000 * 4.75 + 15000 * 3.75 + 12000 * 5.5) = 55.10
Average price on Dec. 4, 2000 $4.65
Average price on Dec. 19, 2000 $4.35

SUB-SUB-SUBGROUP: 16M SDRAM

|  | 1mx16 | 2mx8 | other |
|---|---|---|---|
| spot closing on Dec. 4, 2000 | $3.75 | 4.50 | na |
| shipped | 20000 | na | na |
| spot closing Dec. 19, 2000 | 3.25 | na | na |
| shipped | 10000 | na | na |

I = 100(10000 * 3.25)/(20000 * 3.75) = 43.33
ANOTHER APPROACH (calculating index based on technology)

SUB-SUBGROUP: SDRAM

```
  9B       2B       2B       1B
 64MB    16MB    128MB    OTHERS
```

FOR sdram, pc-100:
According to above breakdown simple average prices = 5.12
according to above breakdown 187,500
Dec. 19, 2000 closing spot: according to above breakdown = 5.06
shipped now: 85,000 + 36,000 + 32,000 = 153,000
according to above breakdown = 126,500

SUB-SUGROUP: EDO

|  | 64m | 16m | 128m |
|---|---|---|---|
| Dec. 4, 2000 | $10.56 | $3.86 | na |
| total shipment | 47000 | 52000 | 89000 |
| Dec. 19, 2000 | $9.56 | $3.74 | na |
| total shipment | 23000 | 36000 | 59000 |

I = 100(23000 * 9.56 + 36000 * 3.75)/(47000 * 10.56 + 52000 * 3.86) = 100(354520)/(697040) = 50.86

SUB-SUBGROUP: FPM

The invention claimed is:

1. A computer-implemented method of reducing market risk and cost for producers and consumers of manufactured products and finished goods in a global marketplace by transformation of in-process material specifications into semi-standard financial instruments based on dynamically updated sector product information, market data, business intelligence, and manufacturing sector general information, the method comprising:

identifying a manufacturing sector based on a measure of the relative importance of the sector in comparison to other sectors of an economy;

creating, using the computer, a hierarchical product taxonomy of a group of products of the sector, comprising:

creating a product taxonomy tree representing the group of products as sector products, wherein the branches of the tree represent successively defined sub-sector products and sub-sector product groupings, and the leaves of the tree represent root products, extracting from a bill of materials for each product group a set of product group items as a sub-group and for each subgroup of the sector a set of product sub-group items, identifying one or more dominant product groups or sub-groups based on the value-added of the group or subgroup being approximately equal to or exceeding 80% of the total dollar value of the product group or subgroup for such product items, wherein the value-added is based on the purchase price of materials for each group or sub-group item, iterating the creating, extracting, and identifying by further branching the product taxonomy tree for each identified dominant product sub-group, until all root products are identified based on applying Pareto's Law to the dollar value-added of identified dominant product groups or sub-groups, and providing, from sector product information suppliers' technical information, a complete product specification by homogenization of the root products as standardized root products;

extracting, using a computer, sector, market data, business intelligence, and manufacturing sector general information from Internet data sources using agent-based filtering, the information including products pricing data;

providing, in a computer database, the hierarchical product taxonomy tree with the sector, market data, business intelligence and manufacturing sector general information for each of the identified dominant product groups and sub-groups; and creating, from the computer database, a semi-standard financial instrument based on each extracted root product and providing the semi-standard financial instrument as a tradeable financial instrument in an electronic marketplace, wherein the value of the financial instrument is adjusted based on a value-weighted price index of at least one underlying derivative associated with the product group(s), sub-group(s), or root product.

* * * * *